INVENTORS,
VERNON L. LAMBERT
NORMAN J. GRI
BY
Charles M. Hogan
ATTORNEY

Jan. 12, 1971 V. L. LAMBERT ET AL 3,554,818

INDIUM ANTIMONIDE INFRARED DETECTOR AND PROCESS FOR MAKING THE SAME

Filed April 25, 1968 2 Sheets-Sheet 2

INVENTORS.
VERNON L. LAMBERT
NORMAN J. GRI

BY

Charles M. Hogan

ATTORNEY.

United States Patent Office 3,554,818

Patented Jan. 12, 1971

3,554,818
INDIUM ANTIMONIDE INFRARED DETECTOR AND PROCESS FOR MAKING THE SAME

Vernon L. Lambert and Norman J. Gri, Cincinnati, Ohio, assignors to Avco Corporation, Cincinnati, Ohio, a corporation of Delaware Filed Apr. 25, 1968, Ser. No. 724,684
Int. Cl. H01l 7/36, 7/44
U.S. Cl. 148—186 4 Claims

ABSTRACT OF THE DISCLOSURE

The invention here disclosed is an indium antimonide infrared detector and a process for making the same. A diffusion process yields a very shallow p-region on an n-type indium antimonide substrate. This layer has a thickness of 1.0 to .5 micron and has a high concentration of acceptors, providing a very efficient collection region for carriers created by photon absorption. The layer is of cadmium or zinc and the concentration is within a range such that while lattice damage occurs detector operation is not impaired. The layer is so shallow that most of the carriers created by photon absorption are collected.

BACKGROUND OF THE INVENTION

The present invention relates to infrared detectors and specifically to a novel infrared detector and method for making the same. The detector is of course the central element in any infrared detector system, performing as it does the function of transforming the incident energy in the photons of light into another form, in this case electrical.

The present invention is in the field of photodetectors. The photodetector is sensitive to and responsive to fluctuations in the number of incident photons.

The photodetector herein described utilizes the photovoltaic effect. That is, changes in the numbers of photons incident on a p-n junction cause fluctuations in the voltage generated by the junction.

The detector here shown is first described on a simplified representative footing as comprising one junction of n-type material and p-type material. The principle and the structure are projected in practice and in the latter part of the description to a device comprising a rather extensive region or "piece" of n-type material and several small regions or "pieces" of p-type material diffused thereon, making up a plurality of junctions. Thus, the detector assembly may contain a single p-n junction or it may be comprised of a multiplicity of p-n junctions arranged in a row-column array that is designed to complement the associated optics. The output from each junction represents the intensity in an elemental area of the scene being viewed. The stream of data resulting from an entire scan of the mosiac represents the entire scene. While the expression "piece" is herein used with reference to the p-material it will be understood that the p-material is diffused into the n-material.

The expression "n-type" material is here employed in the sense of a semiconductor into which a donor impurity has been introduced, so that it contains free electrons. The expression "p-type" material is used in the sense of a semiconductor material into which an acceptor impurity has been introduced, thus providing positive holes.

The invention is concerned with improvements in the construction and manufacture of indium antimonide detectors. Indium antimonide is described by Kruse, McGlaughlin and McQuistan, in Elements of Infrared Technology (New York: Wiley, 1962), page 409, as a "compound semiconductor formed by melting together stoichiometric amounts of indium and antimony." Detectors have been made from indium antimonide (InSb) based upon the photoconductive effect, the photovoltaic effect, and the photoelectromagnetic effect.

The invention described presupposes the use of a high quality single crystal of indium antimonide. The material most commonly used in the practice of this invention has the following approximate characteristics:

| | 77° K. | Room temperature |
|---|---|---|
| Carriers per cubic centimeter | $0.8\text{-}3.1\times10^{15}$ | $10^{16}$ |
| Mobility in square centimeters per volt-second | [1] $10^5$ | $7\times10^4$ |

[1] Or greater.

Doping levels ranging from $10^{14}$ to $10^{17}$ at 77° K. have been used for these detectors. A value in the order of $10^{15}$ appears to be optimum.

An object of the invention is to provide a process yielding a very shallow (0.1 to 0.5) micron p-region on an n-type InSb substrate having a very high concentration of acceptors, thereby forming a very essential collection region for carriers created by photon absorption, so that the photodetector is particularly sensitive.

Another object of the invention is to provide a high impurity concentration of cadmium or zinc in a layer which is unusual in that the concentration is so high that some lattice damage occurs, but without imparing detector operation.

DESCRIPTION OF THE DRAWINGS

FIG. 8: p-material in place
FIG. 9: detector elements passivated
FIG. 10: silicon dioxide in place
FIG. 11: cut out made for contact
FIG. 12: both chromium and gold deposits in place, ohmic contact made.

DETAILED DESCRIPTION OF THE INVENTION

Figure 1:
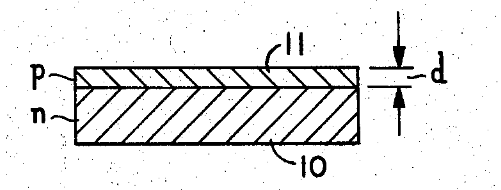
FIG. 1 is an elevational sectional view, showing a typical cross section of a p-n junction.

Referring now to FIG. 1, there is shown a substrate of n-type material, i.e. InSb, with superimposed p-type material 11, formed by solid state diffusion of an acceptor element such as cadmium or zinc. Indium antimonide is described at pages 155 and 409 of the above entitled "Elements of Infrared Technology" and the operation of an indium antimonide photovoltaic detector is discussed at page 410 of the same text.

In the making of detectors in accordance with the invention tellurium was added to the n-type material in order to increase the number of free electrons from $10^{13}$ per cubic centimeter to $10^{15}$ per cubic centimeter. The tellurium comprised donor impurities.

Figure 2:
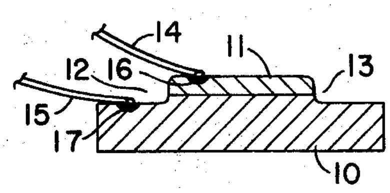
FIG. 2 is an elevational sectional view, showing a typical cross section of a conventional p-n junction utilizing indium soldered connections.
Figure 3:
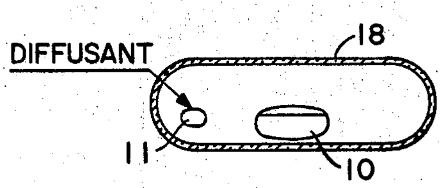
FIG. 3 is an outline drawing of an ampule apparatus used in the diffusion operation herein disclosed.

A mesa type junction detector is formed, according to the prior art, by etching away the excess material in the regions indicated at 12 and 13 in FIG. 2, leaving a plateau or mesa which is defined by a slope, appearing in cross section as shoulders 12 and 13. That is to say, when a mesa is formed, the p-type material and the adjacent portions of the n-type material project upwardly as a small rectangular plateau. In accordance with the prior art, contact is made with the p- and n-material, respectively, by indium soldering of conductors 14 and 15 respectively, thereto.

Figure 4:
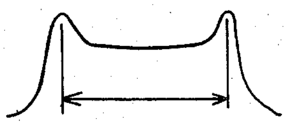
FIG. 4 is a curve showing the output characteristic of the FIG. 2 junction, the ordinates representing output values and the abscissae representing the displacements.

Examination of FIG. 2 establishes that the p-layer must be sufficiently thick, in the prior art structure, to permit the indium soldered connections to be made at 14 and 15, as indicated at 16 and 17, respectively. The soldering operation involves alloying, which requires a relatively thick p-layer. The inventors herein have discovered that this requirement gives rise to a difficulty which constitutes a disadvantage and limitation of the prior art. When a beam of infrared radiation is swept across a detector as illustrated in FIG. 4, the response is not a flat top wave, as is desired. On the contrary, when plotted on a framework of Cartesian coordinates, the resultant wave form shows that the surface of the detector is not at all uniform in its response. That is, when a microscopic ray of light is projected onto the surface of a photodetector junction in accordance with FIG. 2, and when the photo response is recorded as a function of the position of the ray, it is found that the photo response is high as the ray traverses the region 12. The response decreases as the main portions of the mesa are traversed and it finally rises again in the region 13. The inventors herein addressed themselves to the problem of achieving a flat top response and eliminating the undesired discontinuity occurring at the shoulders 12 and 13.

Rephrasing the findings, the diode respons was measured as a beam of infrared radiation was swept across the detector. The edge response was found to be greater than the plateau response. In addressing themselves to the elimination of this difficulty, the inventors started out with a 2.0 micron thickness of p-layer and found that the disparity between the responses was decreased when 0.5 micron of the p-layer was removed. When the layer was reduced to 1 micron in thickness, then the edge response was the same as the plateau response. The inventors further found that when the layer was reduced to 0.5 micron in thickness the initial disparity was not entirely eliminated but was very substantially reduced, by a factor of five.

In order to capitalize on this discovery, the inventors departed from the experimental mode of simply etching away portions of the p-material to provide a layer of optimum thickness and conceived a direct process of manufacture of a junction having the desired uniform characteristics. Additionally, the resultant junction has a sensitivity improved by a substantial order of magnitude.

In accordance with the invention a thin layer of a high concentration of acceptor material, cadmium or zinc, is diffused on the n-material. An acceptor material is substance which has three valence electrons in its atom. When it is added to a semiconductor crystal it creates a positive mobile hole in the lattice structure of the crystal. The diffusion is so shallow that the conventional description of the concentration profile is not applicable thereto. The shallowness permits electron hole carriers to be collected even though the carrier electrical diffusion length is substantially reduced because of the lattice disruption caused by the diffusion.

The process is carried out by placing an indium antimonide wafer 10 in a sealed evacuated quartz ampule 18 approximately 1" in diameter and 6" in length, using as the diffusant a quantity of six 0.001" diameter spheres of cadmium. Diffusion is maintained for four hours at a temperature level of 400° C. Optionally, charges of antimony may be employed in order to prevent antimony evaporation.

Contact with the p-material is provided in accordance with the invention of Norman J. Gri and Eugene T. Yon, which is the subject matter of the co-pending patent application filed simultaneously herewith on Apr. 25, 1968, entitled "Improved Indium Antimonide Infrared Detector Contact and Process for Making the Same." Reference is now made to FIGS. 8–12, for a description of a complete detector incorporating the present invention and the invention of the said co-pending patent application.

Figure 5:
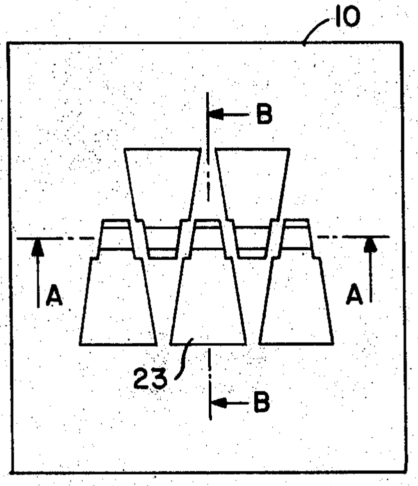
FIG. 5 is a plan view of a detector array in which the p-regions are diffused in accordance with the invention.
Figure 6:
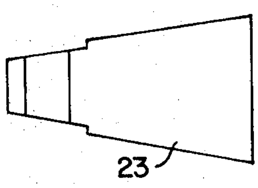
FIG. 6 is a top plan view of one of the detector elements of the FIG. 5 array.
Figure 8:
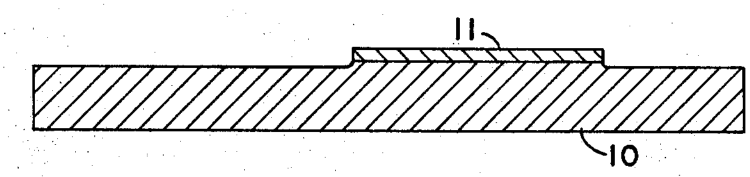
FIGS. 8–12 are elevational sectional views, showing typical cross sections of the detector work piece at the following stages of the complete fabrication process.

Specifically, as illustrated in FIG. 8, a substrate of n-type material 10 is formed into a junction with p-type material 11 in accordance with the present invention. Parenthetically, the finished product is a detector array which comprises a single piece of n-material 10 and a number of me^as aligned along line A—A as illustrated in FIG. 5.

Referring back to FIG. 8 it represents a cross section through a single mesa junction in the state which is achieved following solid state diffusion of p-material on n-material. At that stage the structure of FIG. 8, without passivation, would exhibit diode characteristics which should be improved. The etching which has been referred to above (i.e. the removal of p-material beyond the bounds of the plateau) removes antimony and leaves the surface excessively rich in indium.

Figure 9:
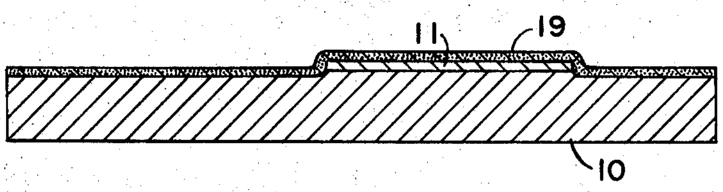

Since indium antimonide is fundamentally a compound semiconductor formed by melting together stoichiometric amounts of indium and antimony, it is necessary to regain the stoichiometric balance. This is accomplished by forming an anodized surface oxide in an alkali solution. The anodization is carried out in conventional manner using a solution of potassium hydroxide or a suitable solution containing the OH radical as the electrolyte. The final film thickness of the oxide 19 is 1000° A. Oxide 19 is passive and is insoluble. This condition is illustrated in FIG. 9.

Figure 10:
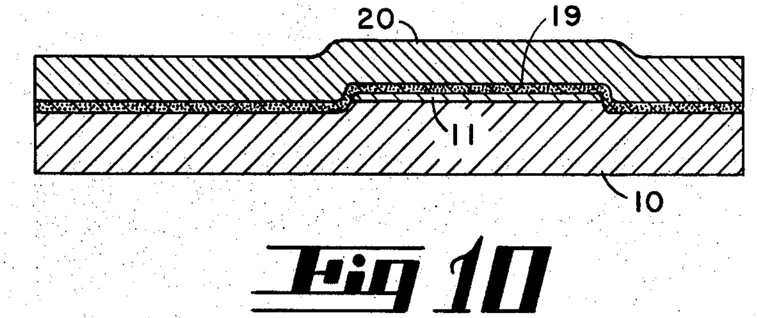

The oxide formed by anodization is characterized by extreme softness and a high dielectric constant. Accordingly, the film 19 is coated with a durable material in order to preclude mechanical damage by abrasion. That is to say, a thickness 20 of approximately 6000° A. of silicon monoxide or silicon dioxide is applied by evaporation or by R.F. (radio frequency) sputtering or electron beam deposition. The completion of this stage is illustrated in FIG. 10. This film functions in three-fold fashion: (1) It serves as a protective coating over the anodized oxide; (2) it provides a low dielectric constant intermediate layer in order to reduce the parasitic capacitance of the device; and (3) it provides an anti-reflectance coating at 5 microns wave length.

Figure 11:
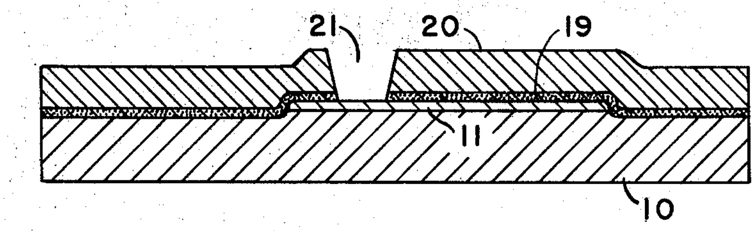

In order to make provision for the installation of an electrical contact in abutment with the p-region a cut-out 21 is made, as by the use of conventional photo-lithographic techniques commonly employed in the fabrication of integrated circuits of the silicon variety. This stage is illustrated in FIG. 11.

The finalization of the process involves a two-step vacuum evaporation technique, for the provision of ohmic contacts and area definition. The substrate is heated to 180° C. and a thin layer of chromium 22, for example, 100° A., is deposited on the substrate to form the ohmic contact and also to provide adherence to the dielectric surface. At the conclusion of this step, a heavy deposit of gold 23 is evaporated through a mask which contains the desired area definition of the final detector assembly.

Figure 7:
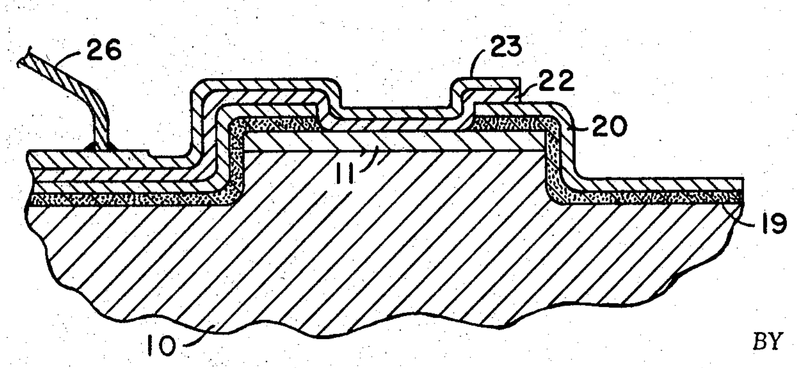
FIG. 7 is an elevational sectional view through a detector in which the p-regions are diffused in accordance with the invention.

The gold layer 23 masks the contact area and renders it insensitive to infrared radiation. As best seen in FIG. 7 it provides a convenient pad, to which connection is made, as by a gold wire 26. This is preferably accomplished by ultrasonic welding techniques.

Figure 12:
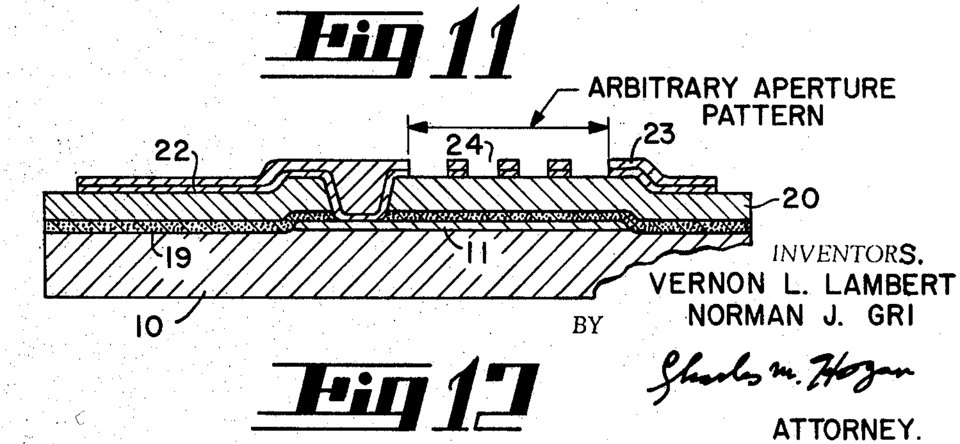

It will be observed in FIG. 12 that three cross sections of the chromium-gold layers are shown in an area which overlies the p-material and is designated 24. This area constitutes a grating or aperture pattern and its showing in FIG. 12 is suggestive of one of the many different gratings or cross sections which can be provided, the materials being masked on at the same time that the contacts are deposited.

Any desired aperture pattern may simultaneously be deposited, as indicated in FIG. 12, to provide for spatial frequency filtering. Suitable patterns are illustrated at pages 656–660 of the "Handbook of Military Infrared Technology" edited by William L. Wolfe of the Office of Naval Research, Superintendent of Documents, Washington, D.C., 1965.

Referring now specifically to FIG. 5, there is shown a detector array which comprises a series of contacts such as 23. Each one of these contacts converges into a contact which is superimposed on a mesa. It will be understood that the gold 23 is underlaid by chromium. A cross sectional view taken along section line B—B of FIG. 5 would correspond to that portion of FIG. 12 which is to the left of the aperture pattern.

It will be understood that a plurality of contacts are made to the various p-regions in the array, five such contacts being illustrated in FIG. 5. On the other hand, a single contact (not shown) is made to the n-type material 10.

Among the advantages of the detector herein shown is a large reverse impedance on the order of one megohm.

Another advantage is the uniformity of the various junctions, as included in a detector array.

While there has been shown and described what is at present considered to be the preferred embodiment of the invention it will be understood by those skilled in the art that various changes and modifications may be made therein without departing from the scope of the invention as defined in the appended claims.

We claim:

1. The method of making a p-n semiconductor junction of an infrared detector which comprises diffusing a p-region of acceptor material into an n-type substrate of indium antimonide, to such a degree that lattice damage occurs without impairing detector operation, said acceptor being a metal selected from Group IIB of the first two long periods of the periodic table.

2. The method in accordance with claim 1 in which the diffusion continues until the thickness of the p-region is from 0.1 to 0.5 micron.

3. The method in accordance with claim 2 in which the diffusion is by the evaporation of cadmium and is sustained for four hours at 400 degrees centigrade.

4. The method in accordance with claim 2 in which the diffusion is by evaporation of zinc and is sustained for thirty minutes at 400 degrees centigrade.

References Cited

UNITED STATES PATENTS

| | | | |
|---|---|---|---|
| 3,448,351 | 6/1969 | Baertsch | 317—235.27 |
| 3,449,177 | 6/1969 | Huth et al. | 317—235.27 |
| 3,458,782 | 7/1969 | Buck et al. | 317—235.27 |
| 3,483,096 | 12/1969 | Gri et al. | 317—235.27 |

L. DEWAYNE RUTLEDGE, Primary Examiner

R. A. LESTER, Assistant Examiner

U.S. Cl. X.R.

148—188, 189; 317—234